(12) United States Patent
Jiang et al.

(10) Patent No.: US 8,409,453 B1
(45) Date of Patent: Apr. 2, 2013

(54) METHOD AND SYSTEM FOR PROVIDING A WRAP-AROUND SHIELD USING A PATTERNED SEED LAYER

(75) Inventors: Ming Jiang, San Jose, CA (US); Changqing Shi, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 256 days.

(21) Appl. No.: 12/778,480

(22) Filed: May 12, 2010

(51) Int. Cl.
*B44C 1/22* (2006.01)

(52) U.S. Cl. ............ 216/22; 216/41; 216/75; 438/717

(58) Field of Classification Search ............ 216/22, 216/41, 58, 77, 78, 72, 75; 360/324.1, 11; 438/717, 720
See application file for complete search history.

(56) References Cited

U.S. PATENT DOCUMENTS

| 7,536,777 | B2 | 5/2009 | Lam et al. |
| 8,166,631 | B1 | 5/2012 | Tran et al. |
| 2006/0044681 | A1* | 3/2006 | Le et al. ............ 360/126 |
| 2007/0115584 | A1* | 5/2007 | Balamane et al. ............ 360/126 |
| 2008/0002310 | A1* | 1/2008 | Cyrille et al. ............ 360/324.12 |
| 2008/0061316 | A1 | 3/2008 | Cohen |
| 2008/0110761 | A1 | 5/2008 | Lam et al. |
| 2008/0113090 | A1* | 5/2008 | Lam et al. ............ 427/123 |
| 2009/0166210 | A1 | 7/2009 | Bonhote et al. |

* cited by examiner

*Primary Examiner* — Lan Vinh

(57) ABSTRACT

A method and system for fabricating magnetic recording transducer are described. The magnetic recording transducer has a main pole, a nonmagnetic gap covering the main pole, and a field region distal from the main pole. A portion of the nonmagnetic gap resides on the top of the main pole. The method and system include providing a patterned seed layer. A thick portion of the patterned seed layer is thicker than a thin portion of the patterned seed layer. At least part of the thick portion of the patterned seed layer resides on a portion of the field region. A wrap-around shield is on the patterned seed layer. At least part of the thin portion of the patterned seed layer is in proximity to and exposed by the wrap-around shield. The method and system also include field etching the field region distal from the wrap-around shield.

24 Claims, 15 Drawing Sheets

METHOD AND SYSTEM FOR PROVIDING A WRAP-AROUND SHIELD USING A PATTERNED SEED LAYER

BACKGROUND

FIG. 1 is a flow chart depicting a conventional method 10 for fabricating a conventional perpendicular magnetic recording (PMR) transducer. For simplicity, some steps are omitted. A conventional, PMR pole is provided, via step 12. The conventional pole is magnetic and has a top wider than its bottom. In addition, the conventional pole has a bevel. Thus, the conventional pole is shorter in the region of the air-bearing surface (ABS) location. The ABS location is the location at which the ABS will reside in the completed structure. The conventional pole may include a leading edge bevel, a trailing edge bevel, or both. The thickness of the conventional pole may be approximately one hundred to two hundred nanometers.

A conventional gap layer is provided, via step 14. The conventional gap layer is nonmagnetic and may be insulating. The conventional gap layer is typically alumina deposited using atomic layer deposition (ALD). As a result, the conventional gap is conformal, covering the top and side of the conventional PMR pole.

A seed layer is deposited, via step 16. The seed layer typically has multiple functions. The seed layer provides the desired growth template for the wrap-around shield to be provided in step 18. In addition, the seed layer generally provides electrical connection to the pole region for plating of the wrap-around shield. Thus, the seed layer is typically approximately one hundred nanometers in thickness. A wrap-around shield may then be plated, via step 18. Typically, the seed layer extends farther than the wrap-around shield to provide connection during electroplating of the wrap-around shield. The exposed portions of the seed layer after the electroplating and photoresist frame stripping are removed, typically via ion milling, in step 20.

FIG. 2 depicts a portion of a conventional PMR transducer 50 formed using the conventional method 10. The conventional transducer 50 includes an underlayer 52, a conventional pole 54 including trailing bevel 56, a conventional gap 58, a conventional seed layer 60 and a conventional wraparound shield 62. Thus, using the conventional method 10, a pole 54 having a trailing edge bevel 56 and wraparound shield 62 may be formed.

Although the conventional method 10 may provide the conventional PMR transducer 50, there may be drawbacks. In particular, the top surface of the pole 54 may be etched and, therefore, damaged during removal of the seed layer 60 in step 20. For example, regions of the pole 54 may be removed, forming depressions 64 therein. The depressions 64 may be quite deep compared to the thickness of the conventional pole 54. For example, the depressions may be sixty or more nanometers thick. Such damage to the pole 54 is generally undesirable. Accordingly, what is needed is an improved method for fabricating a PMR transducer.

SUMMARY

A method and system for fabricating magnetic recording transducer are described. The magnetic recording transducer has a main pole, a nonmagnetic gap covering the main pole, and a field region distal from the main pole. A portion of the nonmagnetic gap resides on the top of the main pole. The method and system include providing a patterned seed layer. A thin portion of the patterned seed layer has a first thickness. A thick portion of the patterned seed layer has a second thickness greater than the first thickness. At least part of the thick portion of the patterned seed layer resides on a portion of the field region. A wrap-around shield is on the patterned seed layer. At least part of the thin portion of the patterned seed layer resides in proximity to and is exposed by the wrap-around shield. The method and system also include field etching the field region. Thus, in some embodiments, the field etching removes thick portions of the patterned seed layer in non-critical regions. In some embodiments, a pre-sputter clean removes thin portions of the patterned seed layer in critical areas closer to the wrap-around shield.

DETAILED DESCRIPTION OF THE PREFERRED EMBODIMENTS

Figure 1:
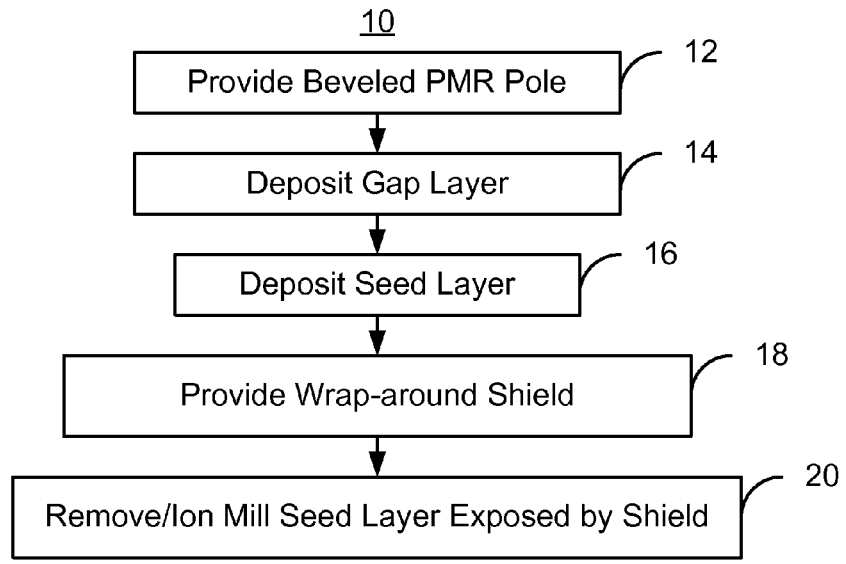
FIG. 1 is a flow chart depicting a conventional method for fabricating a PMR transducer.
Figure 2:
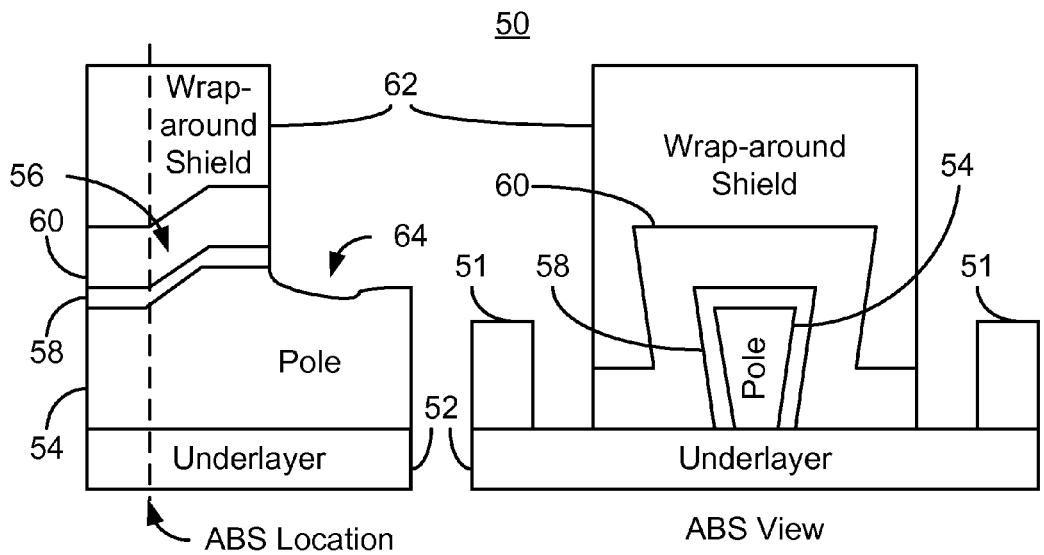
FIG. 2 is a diagram depicting a conventional PMR transducer.
Figure 3:
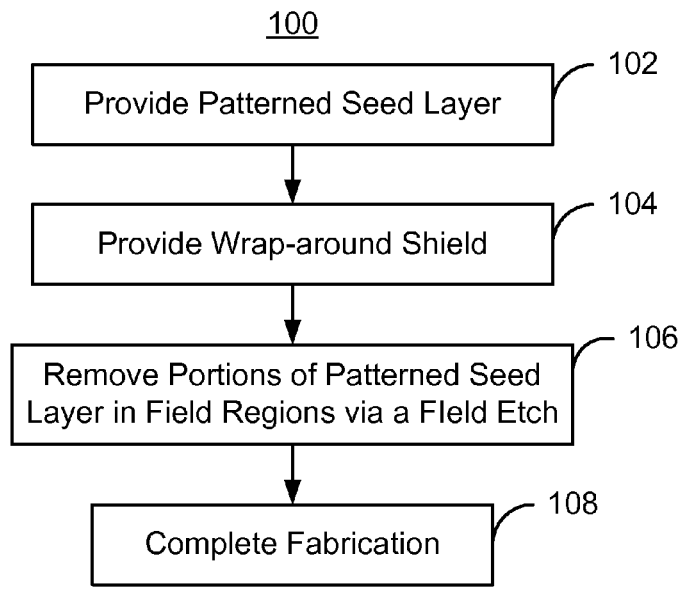
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted and/or combined. The transducer being fabricated may be part of a merged head that also includes a read head (not shown) and resides on a slider (not shown) in a disk drive. The method 100 also may commence after formation of other portions of the transducer. The method 100 is also described in the context of providing a single pole and its associated structures in a single magnetic recording transducer. However, the method 100 may be used to fabricate multiple structure and/or multiple transducers at substantially the same time. The method 100 and system are also described in the context of particular layers. However, in some embodiments, such layers may include multiple sub-layers. In one embodiment, the method 100 commences after formation of the underlayer(s) on which the main pole is to reside. The method 100 may also start after the main pole and nonmagnetic gap have been provided. The main pole may be a PMR pole having its top wider than its bottom. In addition, a top, or trailing edge, bevel may also be provided in the PMR pole. A bottom, or leading edge, bevel might also be provided in the PMR pole. The nonmagnetic gap may be insulating or conductive. For example, aluminum oxide may be used as an insulating, nonmagnetic gap layer. The gap layer may also be conformal, for example being deposited by the atomic layer deposition (ALD). In other embodiments, the conductive gap layer may be Ru. Providing the gap may include depositing the gap layer, then removing the gap away from the pole. However, in other embodiments, other deposition mechanisms, including nonconformal deposition, may be used. In addition, the nonmagnetic gap may cover other structures in the transducer. The magnetic transducer may also include field regions that are distal from the main pole. For example, the field regions may be three to six microns or more from a wrap-around shield deposited on the main pole.

A patterned seed layer is provided on the magnetic transducer, via step 102. The patterned seed layer is so termed because the use of photolithography or analogous techniques in step 102 results in a seed layer having a different thickness in different regions of the seed layer. A thin portion of the patterned seed layer has a first thickness, while a thick portion of the patterned seed layer has a second thickness greater than the first thickness. The thin portion may be one region of the patterned seed layer, while the thick portion may be in another region of the seed layer. Further, in alternate embodiments, the seed layer may have three or more thicknesses corresponding different regions of the seed layer. At least part of the thick portion of the patterned seed layer resides on a portion of the field regions. In some embodiments, step 102 includes blanket depositing at least one thin seed layer for example by sputtering, and depositing at least one thicker seed layer while a mask is in place. In other embodiments, at least one thick seed layer is blanket deposited, for example by sputtering, while at least one thinner seed layer is deposited while a mask is in place. In alternate embodiments, portions of the seed layer may be etched or otherwise removed to form the patterned seed layer. In some embodiments, the thick seed layer(s) and the thin seed layer(s) are composed of the same materials. In other embodiments, the thick and thin seed layers are composed of different materials. In some embodiments, the patterned seed layer is magnetic. In some such embodiments, one or more of the thin and thick portions of the patterned seed layer are magnetic. For example, the magnetic portions include at least one of CoFe, NiFe, and CoNiFe. In other embodiments, at least a portion of the patterned seed layer is nonmagnetic. In some such embodiments, one or more of the thin and thick portions of the patterned seed layer are nonmagnetic. For example, the nonmagnetic portions may include Ru. In some embodiments, a thin Ta adhesion layer may be used under the Ru. In some embodiments, the thinner portion(s) of the patterned seed layer have a thickness of at least two nanometers and not more than twenty nanometers. In some such embodiments, the thin portion(s) of the patterned seed layer are not more than ten nanometers thick. In some embodiments, the thick portion(s) of the patterned seed layer are not more than one hundred nanometers thick. In some such embodiments, the thick portion(s) of the patterned seed layer are at least twenty nanometers.

A wrap-around shield layer is provided on the patterned seed layer, via step 104. Step 104 may include electroplating or otherwise depositing a magnetic material such as NiFe on the seed layer. At least part of the thin portion of the patterned seed layer is in proximity to and may be exposed by the wrap-around shield. A field etch is performed, via step 106. The field etch removes portions of the patterned seed layer in the field region distal from the wrap-around shield. In some embodiments, the field etch includes a wet etch. For example, the field etch may be performed as follows. A mask covering critical regions proximate to the wrap-around shield 420 and covering portions of the field regions may be provided. This mask would expose part of the patterned seed layer distal from the wrap-around shield 420. This exposed portion of the patterned seed layer is removed to form a trench, for example via ion milling. This mask is then removed. Another mask that exposes the field regions, covers the critical regions, and covers a portion of the trench in the patterned layer is provided. A wet etch of the field regions may then be performed. Thus, the thicker portions of the patterned seed layer as well as excess plated material in the field regions are removed.

Fabrication of the transducer may then be completed, via step 108. For example, an insulating layer may be provided on the transducer after the wrap-around shield is provided. In some embodiments, the transducer is precleaned prior to the insulating layer being provided. For example, the transducer may be sputter cleaned or ion milled. At least an exposed part of the thin portion of the patterned seed layer is removed during the precleaning before the oxide deposition. The insulating layer may then be provided. Further, other structures such as coils and additional shields may be fabricated. The magnetic transducer may also be lapped to the ABS location, thereby exposing the ABS.

Figure 4:
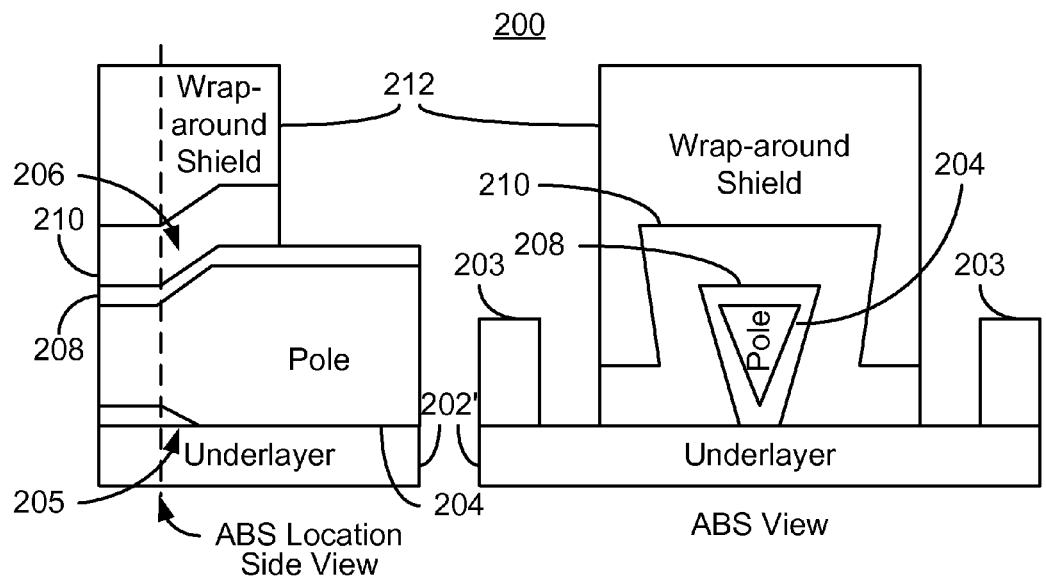
FIG. 4 is a diagram depicting an exemplary embodiment of a PMR transducer.
Figure 5:
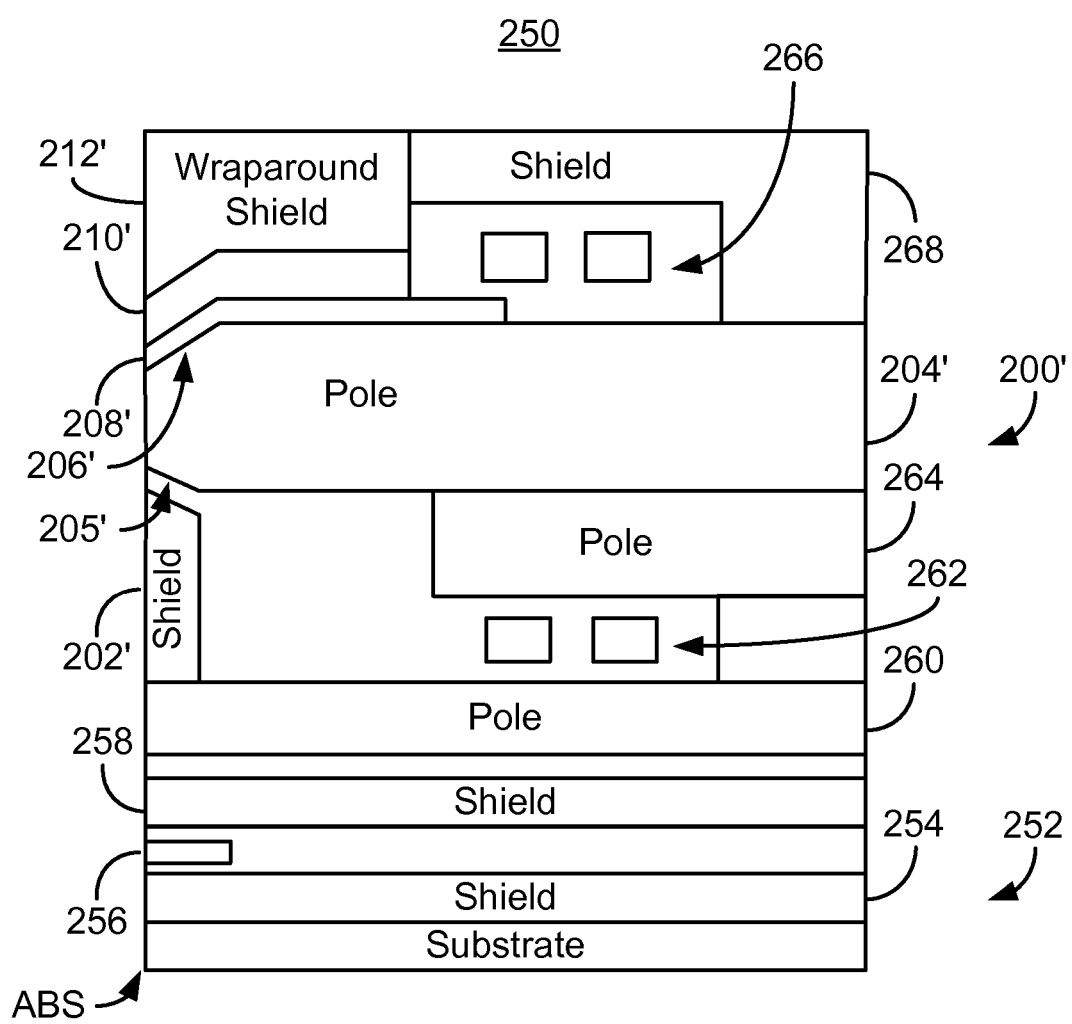
FIG. 5 is a diagram depicting an exemplary embodiment of a PMR head incorporating the PMR transducer.

FIG. 4 is a diagram depicting an exemplary embodiment of a portion of a PMR transducer 200 that may be formed using the method 100. FIG. 5 depicts a head 250 incorporating the transducer 200'. For clarity, FIGS. 4-5 are not to scale. FIG. 4 depicts side and ABS views of the transducer 200, while FIG. 5 depicts a side view only of the head 250. The head 250 shown includes a read transducer 252 and the PMR transducer 200'. However, in another embodiment, the transducer 200/200' may be used in a head including only one or more write transducers 200/200'. The read transducer 252 includes shields 254 and 258 as well as sensor 256. The PMR transducer 200' shown in FIG. 5 includes poles 260 and 264, shield 268, and coils 262 and 266 in addition to the portion of the PMR transducer 200 that is also shown in FIG. 4. The PMR transducer 200/200' includes underlayer 202/shield 202', field regions 203, a main pole 204/204', gap 208/208', patterned seed layer 210/210', and wrap-around shield 212/212'. Other and/or different components may be fabricated in other embodiments. The main pole 204 is shown as having a leading edge bevel 205/205' and 206/206'. However, in some embodiments, the leading edge bevel may be omitted. Also shown is the ABS location in FIG. 4 and the ABS in FIG. 5. For example, in some embodiments, the transducer 200 is lapped to expose the surface of the transducer 200 at the ABS location. In the embodiment shown, the gap 208 appears to enclose the pole 204. However, in some embodiments, a portion of the gap on the top of the pole 204 is deposited separately from at least a portion of the gap 208 below and/or at the sides of the pole 204. Thus, portions of the region 208 may be fabricated at different times and include different materials. However, in some embodiments, all of the region 208 is nonmagnetic.

Using the method 100, the patterned seed layer 210/210' may be provided. Although only a single thickness is shown in FIGS. 4-5, the patterned seed layer 210/210' may have multiple thicknesses in different regions of the transducer 200/200', particularly during fabrication of the wrap-around shield 212. In particular, portions (not shown in FIGS. 4-5) of the patterned seed layer 210/210' adjoining the wrap-around shield 212/212' but not residing under the wrap-around shield 212/212' may be thin. As a result, such thin portions may be easily removed, for example during the preclean prior to deposition of an insulator or other layer after fabrication of the wrap-around shield 212/212'. Thus, damage to the main pole 204/204' due to removal of the patterned seed layer 210/210' may be reduced or eliminated. Thus, performance of the transducer 200/200' may be enhanced. Conversely, other portions (not shown in FIGS. 4-5) of the patterned seed layer 210/210' distal from the wrap-around shield 212/212' and proximate to the field regions 203 may be thicker. Such thick portions allow for improved electrical connection to be made to the patterned seed layer 210/210' during fabrication. More specifically, electrical connection may be made to the patterned seed layer 210/210' during electroplating of structures such as the wrap-around shield 212/212'. These thicker portions of the seed layer may be removed by a wet etch of the field regions 203. Consequently, the thick regions need not be removed by ion milling or other processes which may damage the main pole 204/204' and/or other structures. Fabrication of the transducer 200/200', particularly the wrap-around shield 212/212' may thus be facilitated while allowing for improved performance of the transducer 200/200'.

Figure 6:
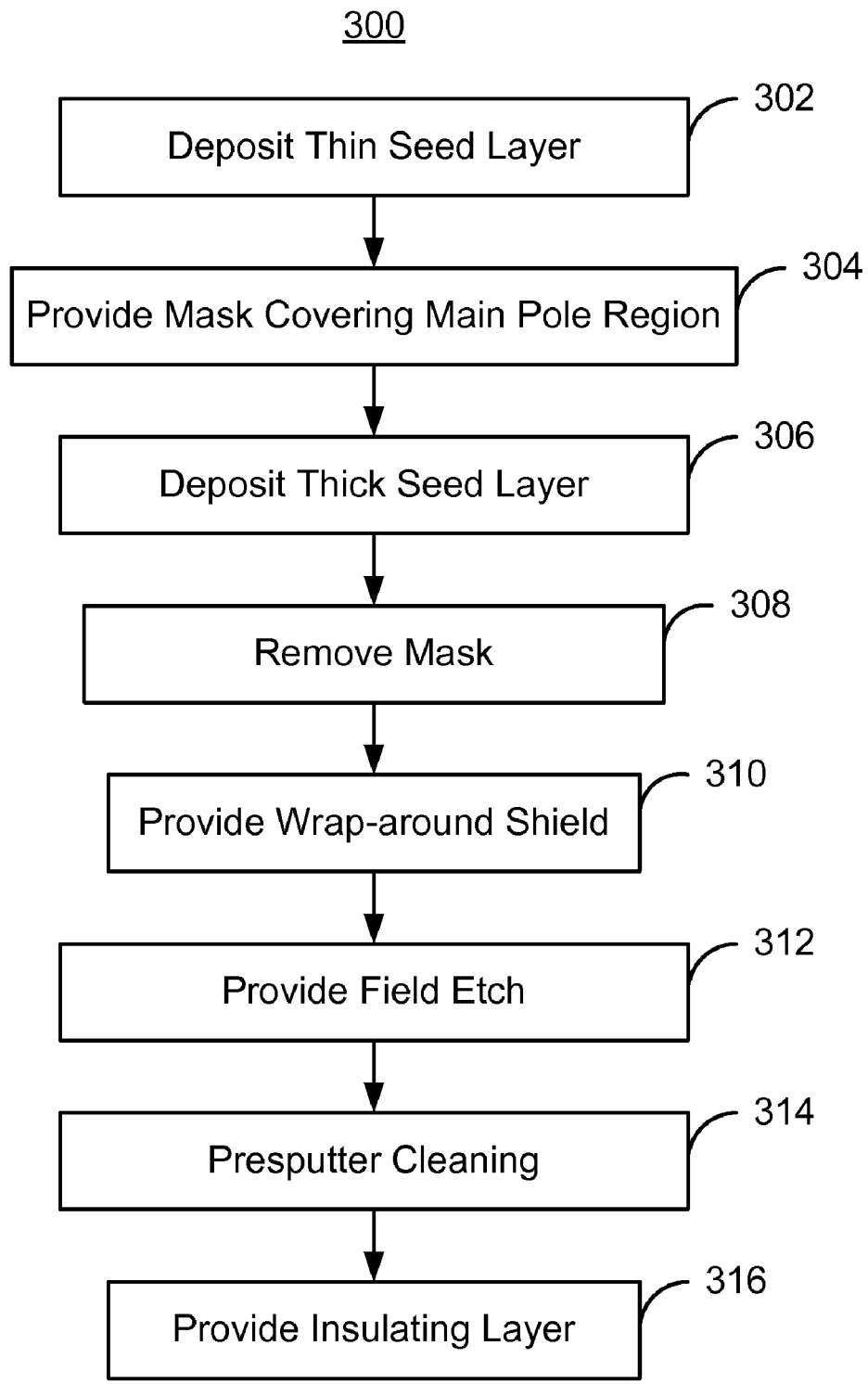
FIG. 6 is a flow chart depicting another exemplary embodiment of a method for fabricating a PMR transducer.
Figure 9:
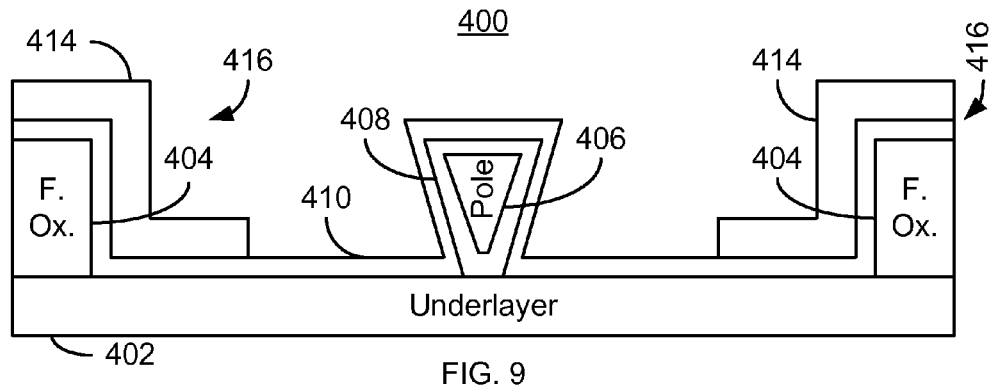
Figure 10:
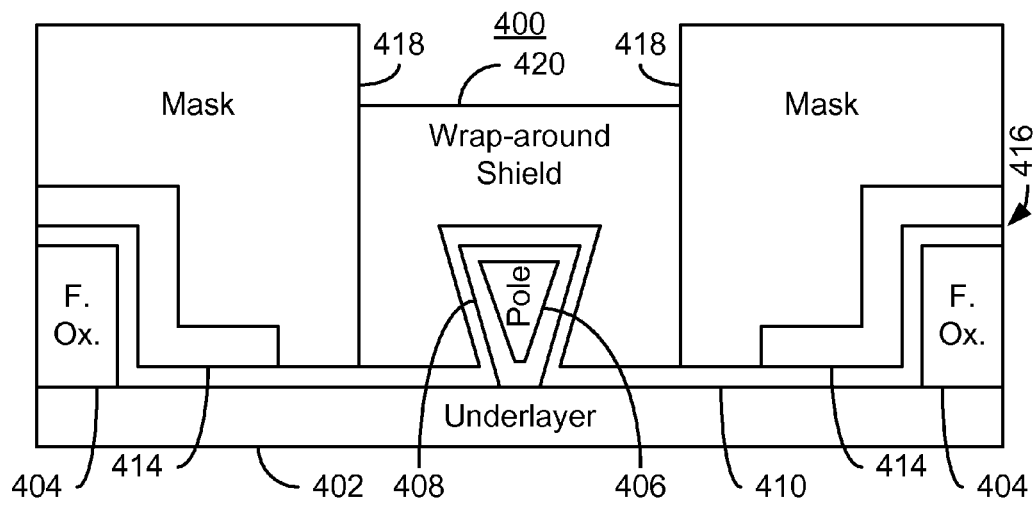
Figure 11:
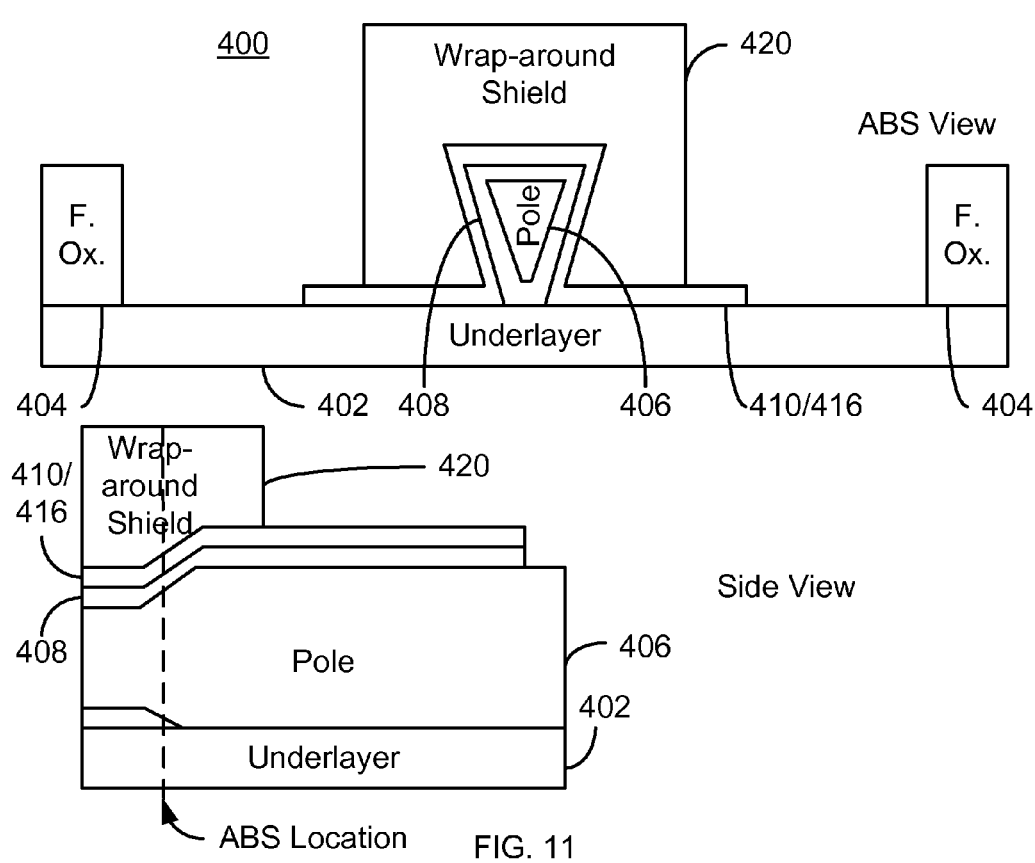
Figure 12:
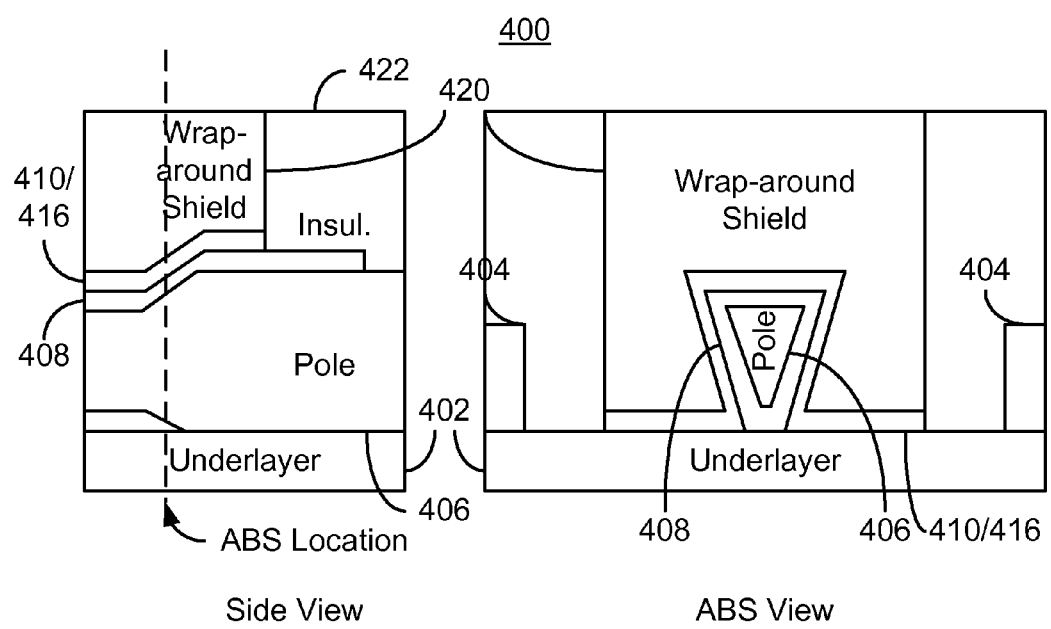

FIG. 6 is a flow chart depicting another exemplary embodiment of a method 300 for fabricating a magnetic transducer that may be a PMR transducer. For simplicity, some steps may be omitted. FIGS. 7-10 are diagrams depicting ABS views of an exemplary embodiment of a portion of a transducer 400 during fabrication. FIGS. 11-12 depict ABS and side views of the transducer 400. For clarity, FIGS. 7-12 are not to scale. Referring to FIGS. 6-12, the method 300 is described in the context of the transducer 400. However, the method 300 may be used to form another device (not shown). The transducer 400 being fabricated may be part of a merged head that also includes a read head (not shown in FIGS. 7-12) and resides on a slider (not shown) in a disk drive. The method 300 also may commence after formation of other portions of the transducer 400. The method 300 is also described in the context of providing a single transducer 400. However, the method 300 may be used to fabricate multiple transducers at substantially the same time. The method 300 and device 400 are also described in the context of particular layers. However, in some embodiments, such layers may include multiple sublayers.

In one embodiment, the method 300 commences after formation of the underlayer(s) on which the main pole is to reside. The method 300 may also start after the main pole and nonmagnetic gap have been provided. The main pole may be a PMR pole having its top wider than its bottom. In addition, a top, or trailing edge, bevel may also be provided in the PMR pole. A bottom, or leading edge, bevel might also be provided in the PMR pole. The nonmagnetic gap may be insulating or conductive. For example, aluminum oxide may be used as an insulating, nonmagnetic gap layer. The gap layer may also be conformal, for example being deposited by the atomic layer deposition (ALD). For example, Ru may be used as the conductive gap layer. Providing the gap may include depositing the gap layer, then removing the gap away from the pole. However, in other embodiments, other deposition mechanisms, including nonconformal deposition, may be used. In addition, the nonmagnetic gap may cover other structures in the transducer. The magnetic transducer may also include field regions that are distal from the main pole. For example, the field regions may be three to six microns or more from a wrap-around shield deposited on the main pole.

A thin seed layer is blanket deposited, via step 302. The thin seed layer covers at least the nonmagnetic gap on the main pole. In addition, the thin seed layer may be sufficiently thin that it can be removed during the preclean and before the oxide deposition, described below. The thin seed layer may also be sufficiently thick that it is continuous and is electrically conductive for electroplating. In some embodiments, the thin seed layer is at least two nanometers and not more than twenty nanometers thick. In some such embodiments, the thin seed layer may be not more than ten nanometers thick. The thin seed layer may be magnetic or nonmagnetic. If magnetic, the thin seed layer may include materials such as CoFe, NiFe, and/or CoNiFe. If nonmagnetic, the thin seed layer may include materials such as Ru.

Figure 7:
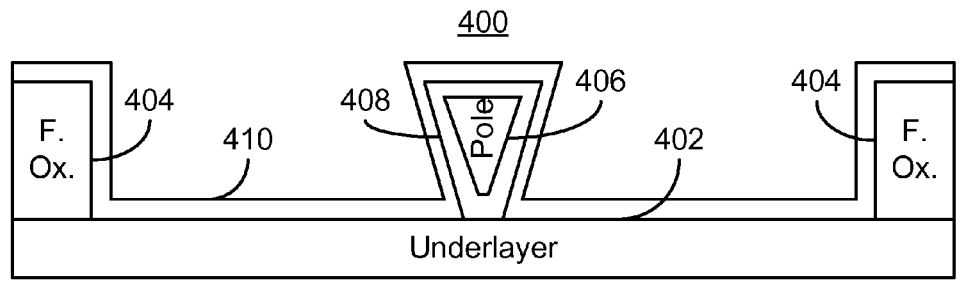
FIGS. 7-12 are diagrams depicting an exemplary embodiment of a PMR transducer during fabrication.

FIG. 7 depicts the transducer 400 after step 302 is performed. Thus, an underlayer 402 and field regions 404 are shown. Nonmagnetic gap layer 408 and main pole 406 are also shown. Although the main pole 406 is shown as having a trapezoidal cross-section, other shapes are possible. For example, the main pole 406 may be triangular in shape at the ABS. In addition, in the embodiment shown, the top of the main pole 406 is wider than the bottom. The gap layer 408 is shown as surrounding the pole 406. However, in other embodiments, the gap layer 408 may not be under the main pole 406. In some embodiments, the gap 408 is conformally deposited. Thus, a portion of the gap 408 on the top and sides of the main pole may be formed by a single deposition. In other embodiments, the sides of the gap 408 may be formed separately from the portion of the gap 408 top of the main pole 406. Also shown is a thin seed layer 410 that has been blanket deposited on the transducer 400. Thus, the thin seed layer 410 covers the gap layer 408, the main pole 406, the field oxide 404 and field regions around the field oxide 404, and underlayer 402.

A mask covering a portion of the magnetic transducer 400 proximate to the main pole 406 is provided, via step 304. Step 304 may be performed using conventional photolithography. The mask covers a portion of the thin seed layer 410 as well as the main pole 406 and gap 408. However, a portion of the thin seed layer 410 is exposed.

Figure 8:
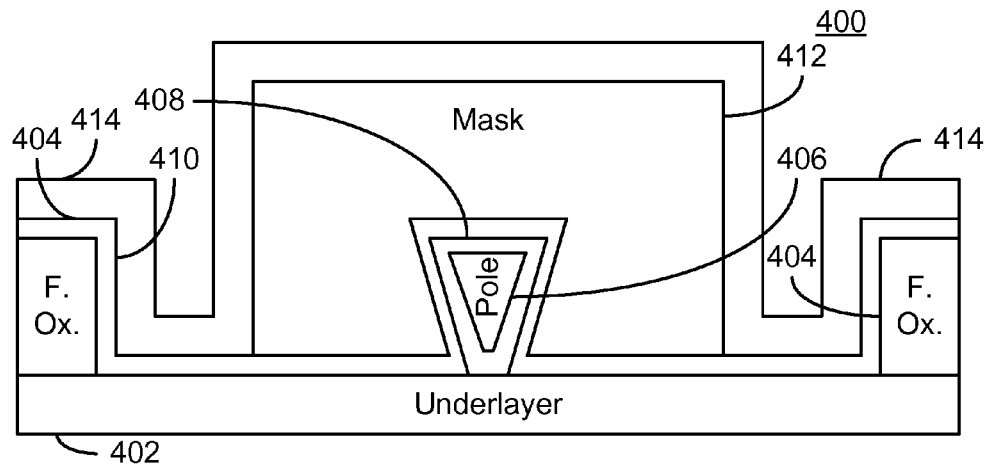

A thick seed layer is deposited while the mask is in place, via step 306. Thus, the thick seed layer resides on the mask and on the exposed portion of the thin seed layer 410. Step 306 may include sputtering or otherwise depositing the thick seed layer. The thick seed layer may be magnetic or nonmagnetic. If magnetic, the thick seed layer may include materials such as CoFe, NiFe, and/or CoNiFe. If nonmagnetic, the thick seed layer may include materials such as Ru. The thick seed layer may include the same or different material(s) as those used in the thin seed layer 410. FIG. 8 depicts the transducer 400 after step 306 has been performed. Thus, the mask 412 is shown. In some embodiments, the outer edges of the mask 412 are distal from the main pole 406. For example, in some embodiments, the edges of the mask 412 may be three through six microns or more from the main pole 406. In some embodiments, the thickness of the thicker seed layer 414 is fifty through one hundred nanometers. The combined thickness of the thick seed layer 414 and the portion of the thin seed layer 410 underlying the thick seed layer 414 corresponds to the thickness of the thick portions of the patterned seed layer.

The mask 412 may be removed, via step 308. Step 308 may include performing a lift off of the mask 412. Steps 302, 304, 306, and 308 may thus be considered to fabricate a patterned seed layer. FIG. 9 depicts the transducer 400 after step 308 is performed. Thus, the thin seed layer 410 and portions of the thick seed layer 414 remain. The remaining portions of the thick seed layer 414 and the thin seed layer 410 together form a patterned seed layer 416.

A wrap-around shield is provided, via step 310. Step 310 includes providing a mask that exposes a region of the transducer 400 proximate to the main pole 406 and depositing the magnetic and any other material(s) for the wrap-around shield. In some embodiments, the warp-around shield may be electroplated. Thus, the patterned seed layer 416, particularly the thick seed layer 414, may be used to make electrical connection to the transducer 400 for plating the wrap-around shield. The mask for the wrap-around shield may then be removed, for example by a photoresist strip. FIG. 10 depicts the transducer 400 during step 310. Thus, the mask 418 for plating the wrap-around shield is shown and has not yet been removed. In addition, the wrap-around shield 420 is also shown. As can be seen in FIG. 10, a portion of the thin seed layer 410 is under the mask 418, and exposed by the shield 420.

After removal of the mask 418, the field regions, which include the field oxide 404, are field etched, via step 312. In some embodiments, the field etch includes a wet etch. For example, the field etch may be performed as follows. A mask covering critical regions proximate to the wrap-around shield 420 and covering portions of the field regions may be provided. This mask would expose part of the patterned seed layer distal from the wrap-around shield 420. This exposed portion of the patterned seed layer is removed to form a trench, for example via ion milling. This mask is then removed. A field etch mask that exposes the field regions, covers the critical regions, and covers a portion of the trench in the patterned layer is provided. A wet etch of the field regions may then be performed. Thus, the thicker portions of the patterned seed layer as well as excess plated material in the field regions are removed. In some embodiments, this field etch mask covers a region that extends over the main pole 406 and is three to six microns from the outer edges of the wrap-around shield 420. FIG. 11 depicts the transducer after step 312 has been performed. Consequently, portions of the patterned seed layer 416 have been removed. In some embodiments, all of the thick seed layer 414 is removed. A portion of the patterned seed layer 416 proximate to the main pole 404 and wrap-around shield 420 remain. Of this, a portion of the thin seed layer 410/patterned seed 416 is exposed by the wrap-around shield 420. As shown in side view of FIG. 11, a portion of the thin seed layer 410/patterned seed 416 exposed by the wrap-around shield is distal from the ABS.

The magnetic transducer is precleaned before oxide deposition, via step 314. Precleaning may include sputter etching or ion milling the magnetic transducer. During the precleaning in step 314, the portion of the thin seed layer 410 exposed by the wrap-around shield 420 is removed.

An aluminum oxide layer or other insulating layer is after the magnetic transducer is precleaned, via step 312. Step 312 may include masking a portion of the transducer, then depositing the insulating layer. FIG. 12 depicts side and ABS views of the magnetic transducer 400 after step 312 is performed. The portion of the thin seed layer 410/patterned seed layer 416 exposed by the wrap-around shield 420 may be removed during the precleaning. Thus, any portion of the thin seed layer 410/patterned seed layer 416 that would reside under the insulating layer 422 and behind the wrap-around shield 420 as viewed from the ABS is removed. Similarly, portions of the thin seed layer 410/patterned seed layer 416 that would adjoin the wrap-around shield 420 in the ABS view are also removed. An insulating layer 422 has also been provided.

Using the method 300, the transducer 400 may be provided. As a result, the wrap-around shield 420 may be electroplated because the thick seed layer 414 in combination with portions of the thin seed layer 410 (e.g. thick portions of the patterned seed layer 416) improve electrical connection during plating of the wrap-around shield 420. Thus, fabrication of the wrap-around shield 420 may be facilitated. The thick seed layer 414 and the portions of the thin seed layer 410 underlying the thick seed layer 414 (corresponding to thick portions of the patterned seed layer 416) are removed during the field etch in step 312. The remaining thin seed layer 410/patterned seed layer 416 exposed by the wrap-around shield 420 are removed by the preclean before oxide deposition in step 314. As a result, the patterned seed layer 416 may be removed in the desired regions substantially without damaging the pole 404. Thus, fabrication of the wrap-around shield 420 may be facilitated without adversely affecting performance of the transducer 400.

Figure 13:
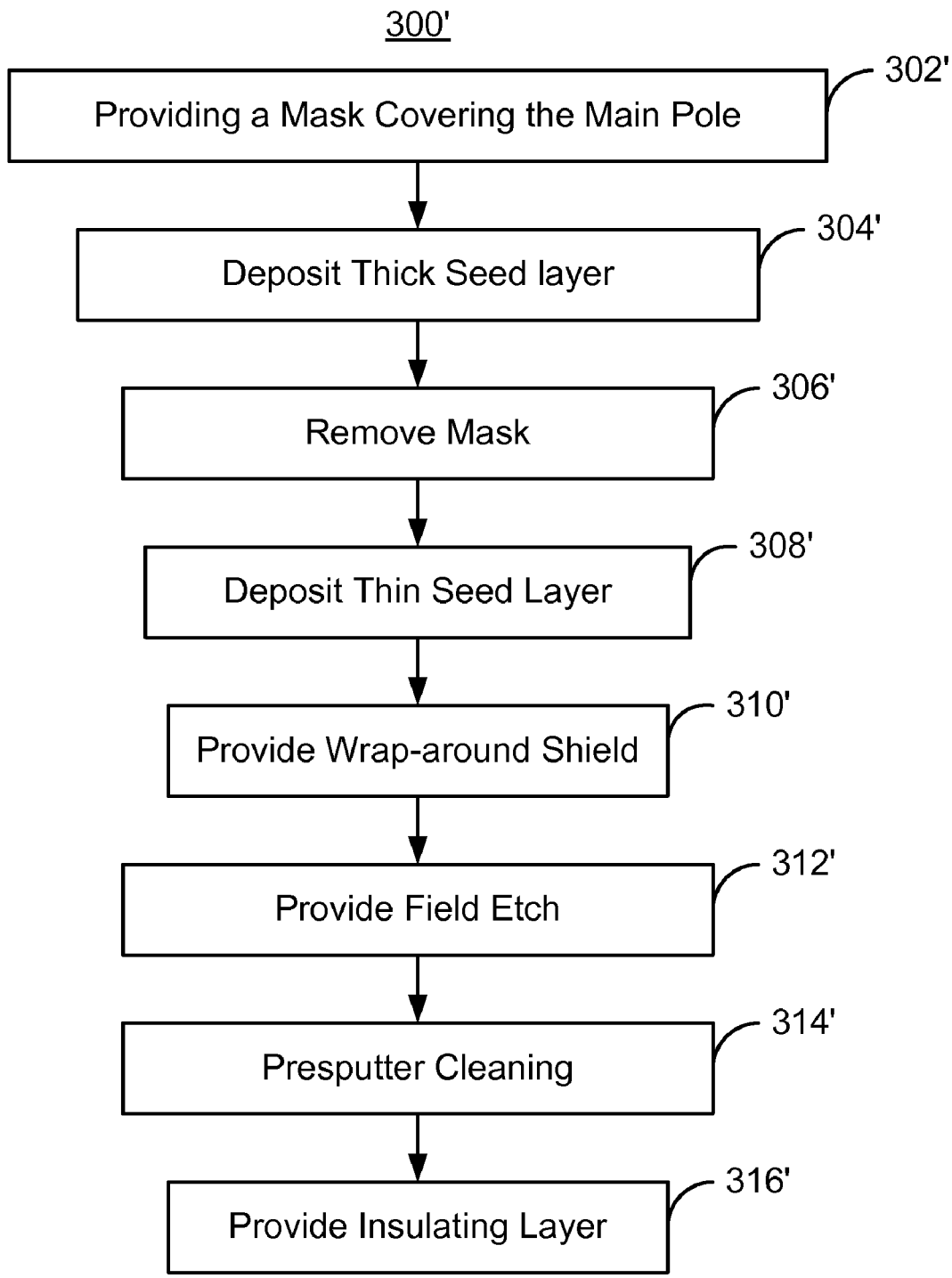
FIG. 13 is a flow chart depicting another exemplary embodiment of a method for fabricating a PMR transducer.
Figure 14:
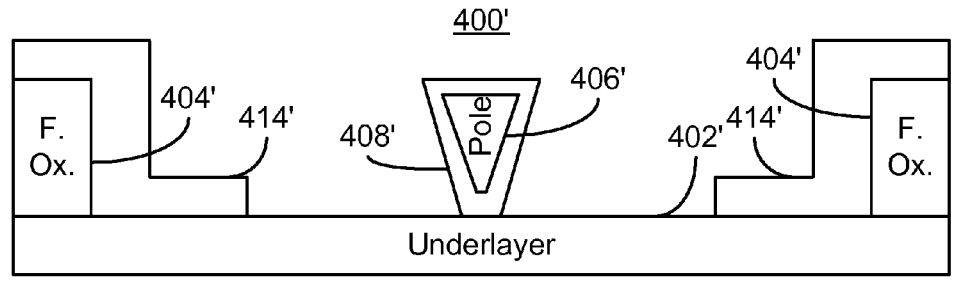
FIGS. 14-18 are diagrams depicting an exemplary embodiment of a PMR transducer during fabrication.
Figure 15:
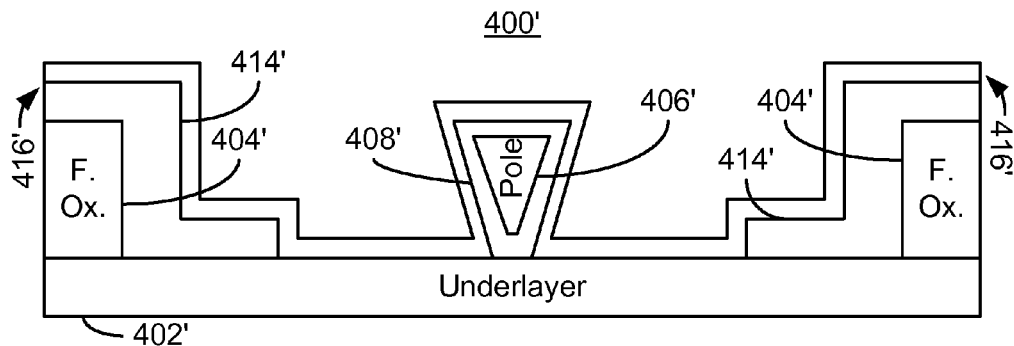
Figure 16:
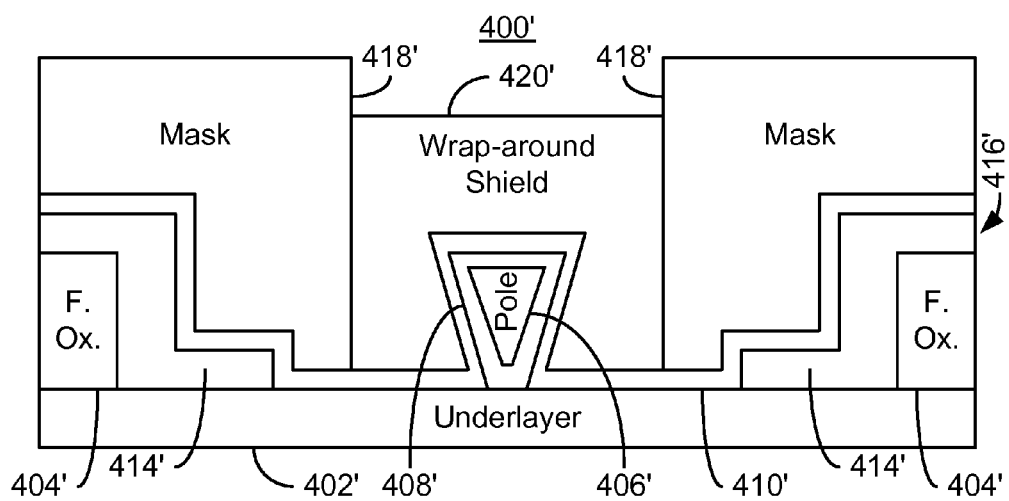
Figure 17:
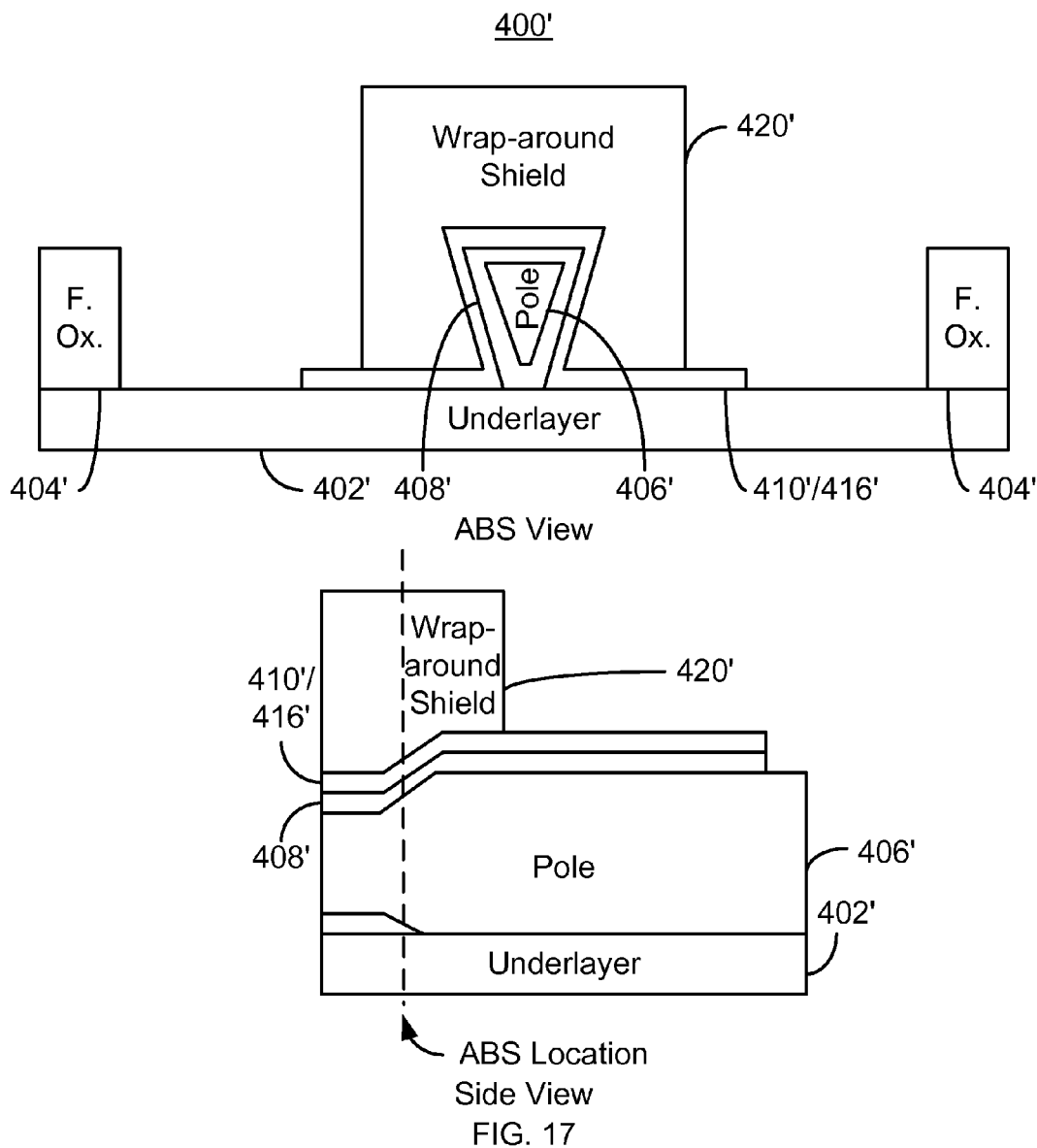
Figure 18:
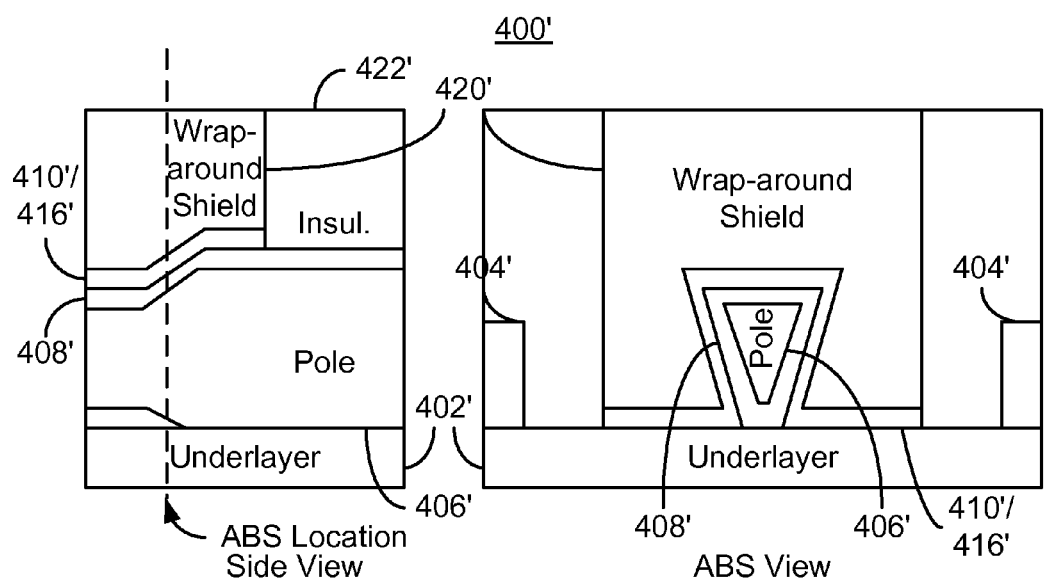

FIG. 13 is a flow chart depicting another exemplary embodiment of a method 300' for fabricating a magnetic transducer that may be a PMR transducer. For simplicity, some steps may be omitted. FIGS. 14-16 are diagrams depicting ABS views of an exemplary embodiment of a portion of a transducer 400' during fabrication. FIGS. 17-18 depict ABS and side views of the transducer 400. For clarity, FIGS. 14-18 are not to scale. Referring to FIGS. 13-18, the method 300' is described in the context of the transducer 400'. However, the method 300' may be used to form another device (not shown). The transducer 400' being fabricated may be part of a merged head that also includes a read head (not shown in FIGS. 13-18) and resides on a slider (not shown) in a disk drive. The method 300' also may commence after formation of other portions of the transducer 400'. The method 300' is also described in the context of providing a single transducer 400'. However, the method 300' may be used to fabricate multiple transducers at substantially the same time. The method 300' and device 400' are also described in the context of particular layers. However, in some embodiments, such layers may include multiple sublayers. Portions of the method 300' and transducer 400' are analogous to the method 300 and transducer 400. Consequently, such portions are labeled similarly.

In one embodiment, the method 300' commences after formation of the underlayer(s) on which the main pole is to reside. The method 300' may also start after the main pole and nonmagnetic gap have been provided. The main pole may be a PMR pole having its top wider than its bottom. In addition, a top, or trailing edge, bevel may also be provided in the PMR pole. A bottom, or leading edge, bevel might also be provided in the PMR pole. The nonmagnetic gap may be insulating or conductive. For example, aluminum oxide may be used as an insulating, nonmagnetic gap layer. The gap layer may also be conformal, for example being deposited by the atomic layer deposition (ALD). Providing the gap may include depositing the gap layer, then removing the gap away from the pole. However, in other embodiments, other deposition mechanisms, including nonconformal deposition, may be used. In addition, the nonmagnetic gap may cover other structures in the transducer. The magnetic transducer may also include field regions that are distal from the main pole. For example, the field regions may be three to six microns or more from a wrap-around shield deposited on the main pole.

A mask covering a portion of the magnetic transducer 400' a region proximate to the main pole, via step 302'. A thick seed layer is deposited while the mask is in place, via step 304'. Thus, the thick seed layer resides on the mask and on the exposed portion of the transducer 400'. Step 304' may include sputtering or otherwise depositing the thick seed layer. The thick seed layer may be magnetic or nonmagnetic. If magnetic, the thick seed layer may include materials such as CoFe, NiFe, and/or CoNiFe. If nonmagnetic, the thick seed layer may include materials such as Ru. The mask is then removed, via step 306'. Step 306' may include performing a resist strip.

FIG. 14 depicts the transducer 400' after step 306' is performed. Thus, an underlayer 402' and field regions 404' are shown. Nonmagnetic gap layer 408' and main pole 406' are also shown. The structures 402', 404', 406', and 408' are analogous to structures 402, 404, 406, and 408, respectively. Also shown is a thick seed layer 414' that is analogous to the thick seed layer 414. In some embodiments, the thickness of the thicker seed layer 414' is fifty through one hundred nanometers. In some embodiments, the outer edges of the mask were distal from the main pole 406'. For example, in some embodiments, the edges of the mask may be three through six microns or more from the main pole 406. Thus, the thick seed layer 414' may be three through six microns from the main pole 406'. In some embodiments, the thickness of the thicker seed layer 414' is fifty through one hundred nanometers.

A thin seed layer is deposited, via step 308'. The thin seed layer covers at least the nonmagnetic gap on the main pole. In addition, the thin seed layer may be sufficiently thin that it can be removed during the preclean, described below. The thin seed layer may also be sufficiently thick that it is continuous and is electrically conductive for electroplating. In some embodiments, the thin seed layer is at least two nanometers and not more than twenty nanometers thick. In some such embodiments, the thin seed layer may be not more than ten nanometers thick. The thin seed layer may be magnetic or nonmagnetic. If magnetic, the thin seed layer may include materials such as CoFe, NiFe, and/or CoNiFe. If nonmagnetic, the thin seed layer may include materials such as Ru. In addition, the thin seed layer may contain the same materials as or different materials from the thick seed layer 414'.

FIG. 15 depicts the transducer 400' after step 308' is performed. Thus, the thin seed layer 410' that has been blanket deposited on the transducer 400' is shown. The thin seed layer 410' covers the gap layer 408', the main pole 406', the field oxide 404' and field regions around the field oxide 404', underlayer 402', and the thick seed layer 414'. Thus, a patterned seed layer 416' is provided. The patterned seed layer 416' has thick portions corresponding to the combination of the thick seed layer 414' and portions of the thin seed layer 410'. The patterned seed layer 416' also has thin portions corresponding to the thin seed layer 410'. Thus, like the method 300, a patterned seed layer 416' is provided in steps 302', 304', 306', and 308'. Further, the thin portion of the patterned seed layer 416'/a portion of the thin seed layer 410' reside on the main pole 406'

A wrap-around shield is provided, via step 310'. Step 310' is analogous to step 310 of the method 300. Step 310' thus includes providing a mask that exposes a region proximate to the main pole 406', depositing the main pole, for example via electroplating, and removing the mask. FIG. 16 depicts the transducer 400' during step 310'. Thus, the mask 418' for plating the wrap-around shield is shown and has not yet been removed. In addition, the wrap-around shield 420' is also shown. As can be seen in FIG. 16, a portion of the thin seed layer 410' is under the mask 418', and exposed by the shield 420'.

After step 310', the field regions, which include the field oxide 404', are field etched, via step 312'. Step 312' is analogous to step 312. In some embodiments, the field etch includes a wet etch. For example, the field etch may be performed as follows. A mask covering critical regions proximate to the wrap-around shield 420 and covering portions of the field regions may be provided. This mask would expose part of the patterned seed layer distal from the wrap-around shield 420. This exposed portion of the patterned seed layer is removed to form a trench, for example via ion milling. This mask is then removed. A field etch mask that exposes the field regions, covers the critical regions, and covers a portion of the trench in the patterned layer is provided. A wet etch of the field regions may then be performed. Thus, the thicker portions of the patterned seed layer as well as excess plated material in the field regions are removed. In some embodiments, this field etch mask covers a region that extends over the main pole 406' and is three to six microns from the outer edges of the wrap-around shield 420'. A wet etch that removes the exposed portions of the patterned seed layer 416'may thus be performed. FIG. 17 depicts the transducer after step 312' has been performed. Consequently, portions of the patterned seed layer 416', including all of the thick seed layer 414', have been removed. The region proximate to the main pole 404' and wrap-around shield 420' remain. Only a portion of the thin seed layer/patterned seed layer 410'/416' remain. Of this, a portion of the thin seed layer 410'/patterned seed 416' is exposed by the wrap-around shield 420'. As shown in the side view of FIG. 17, a portion of the thin seed layer 410'/patterned seed 416' exposed by the wrap-around shield is distal from the ABS.

The magnetic transducer is precleaned before oxide deposition, via step 314'. Precleaning may include sputter etching or ion milling the magnetic transducer. During the precleaning in step 314', the portion of the thin seed layer 410' exposed by the wrap-around shield 420' is removed.

An aluminum oxide layer or other insulating layer is after the magnetic transducer is precleaned, via step 312'. Step 312' may include masking a portion of the transducer, then depositing the insulating layer. FIG. 18 depicts side and ABS views of the magnetic transducer 400' after step 312' is performed. Thus, any portion of the thin seed layer 410'/patterned seed layer 416' that would reside under the insulating layer 422' and behind the wrap-around shield 420' as viewed from the ABS is removed. Similarly, the portion of the thin seed layer 410'/patterned seed layer 416' exposed by the wrap-around shield 420' and adjoining the wrap-around shield as seen from the ABS may be removed during the precleaning. An insulating layer 422' has also been provided.

The method 300' may provide the benefits of the method 300. More specifically, fabrication of the transducer 400' is facilitated substantially without adversely affecting performance of the transducer 400".

Figure 19:
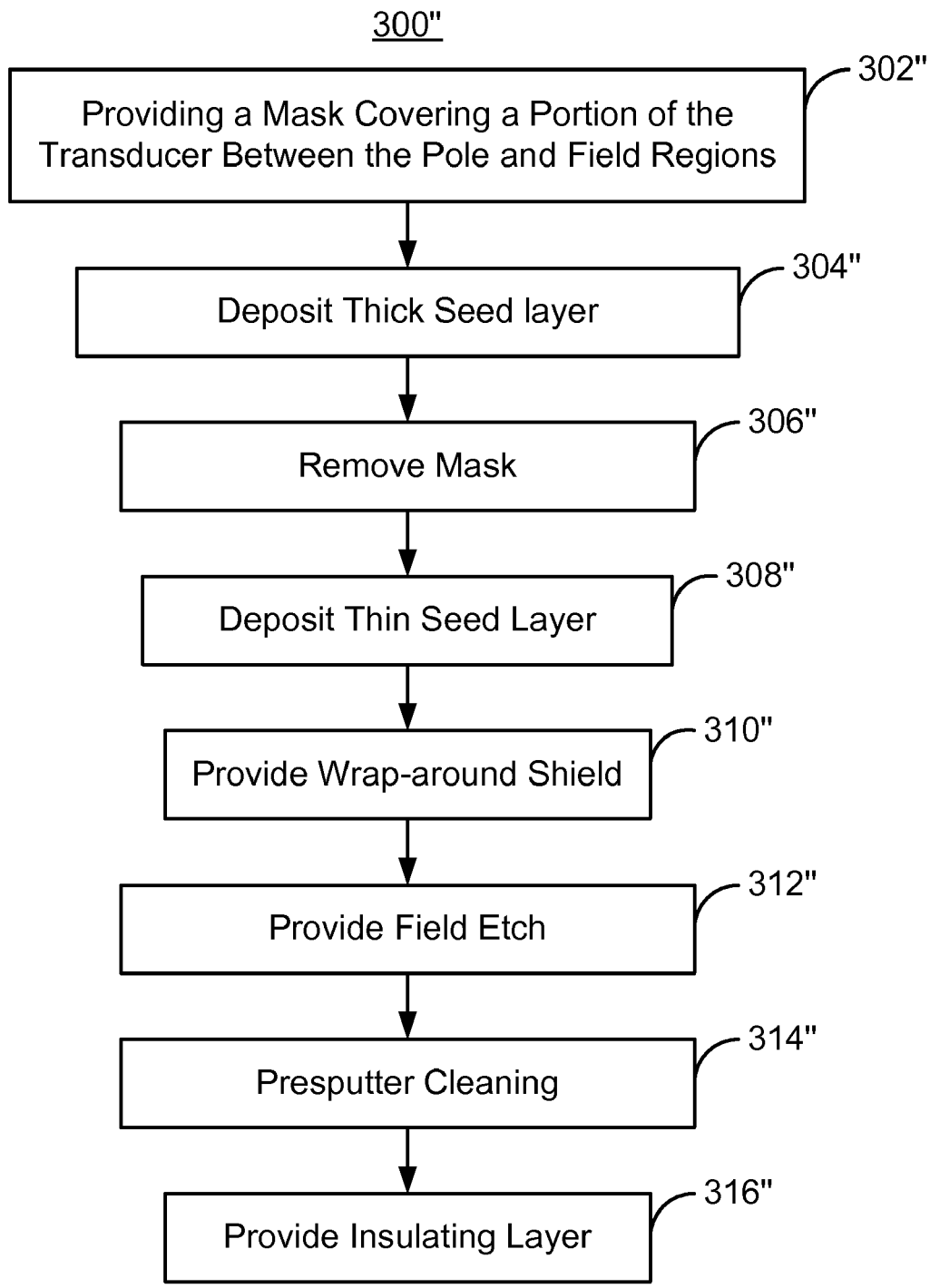
FIG. 19 is a flow chart depicting another exemplary embodiment of a method for fabricating a PMR transducer.
Figure 20:
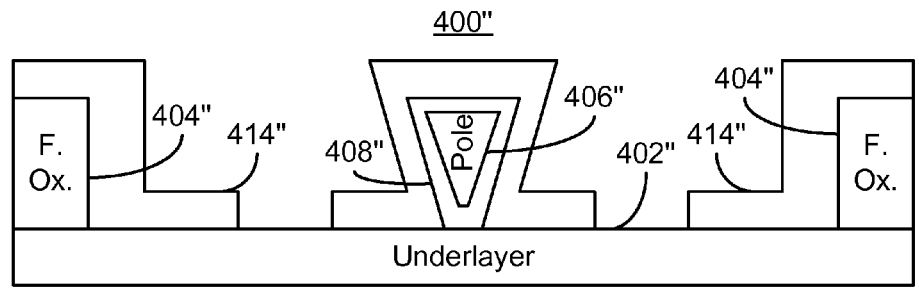
FIGS. 20-24 are diagrams depicting an exemplary embodiment of a PMR transducer during fabrication.
Figure 21:
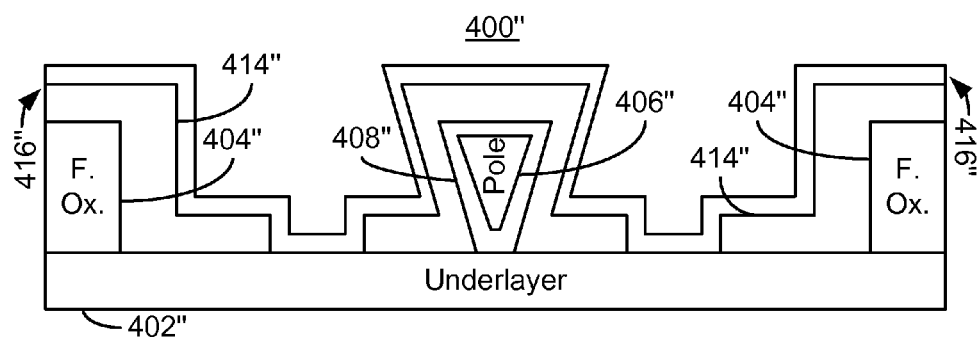
Figure 22:
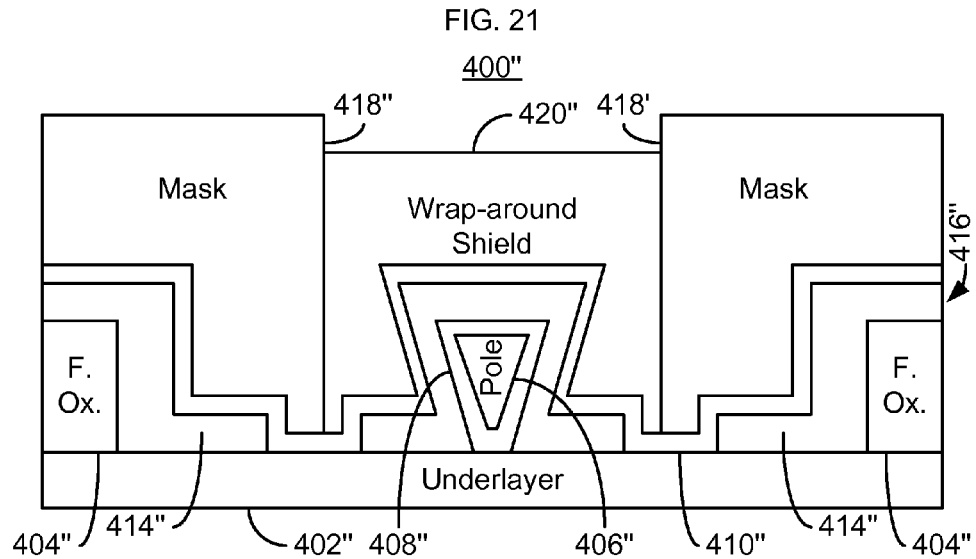
Figure 23:
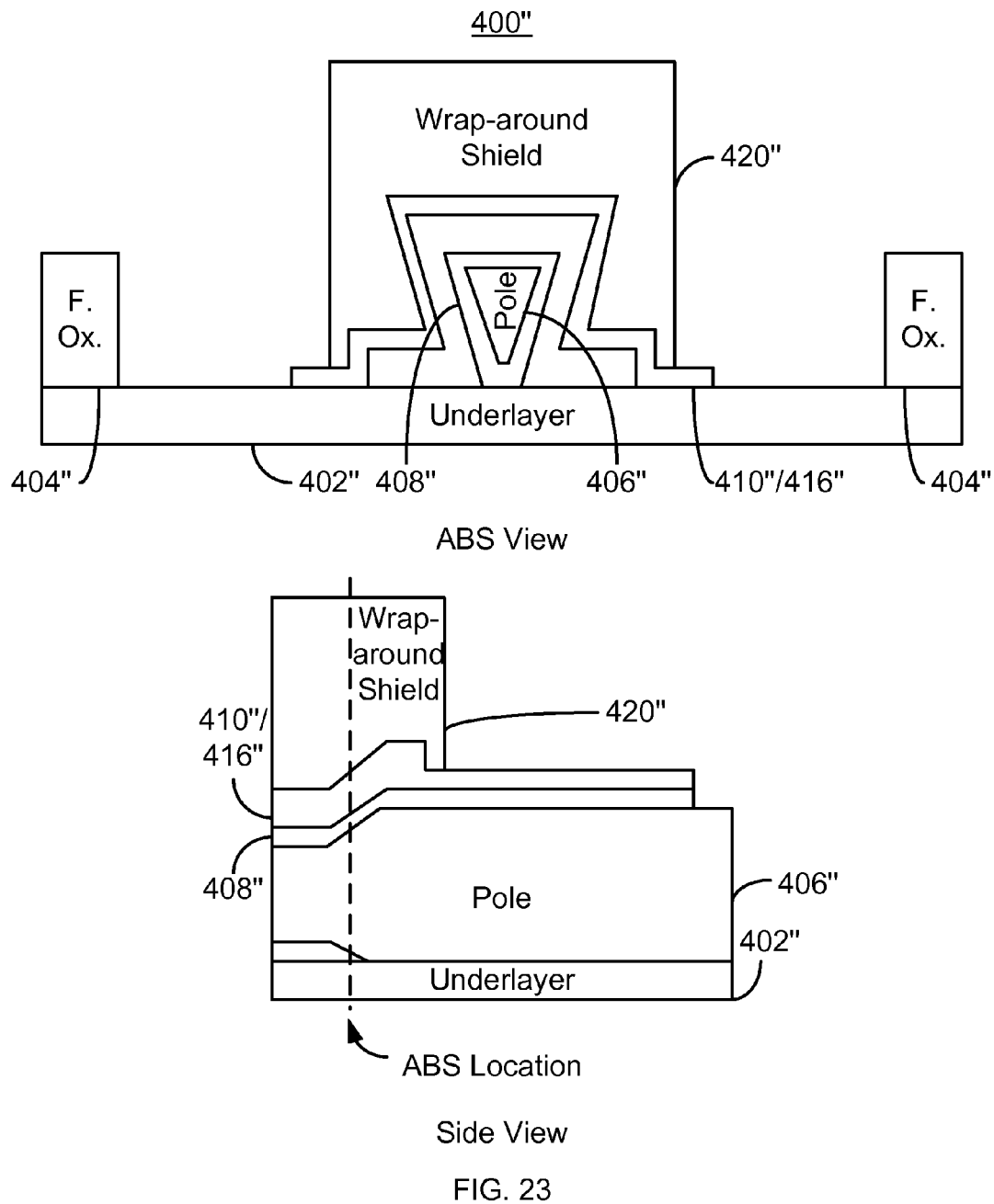
Figure 24:
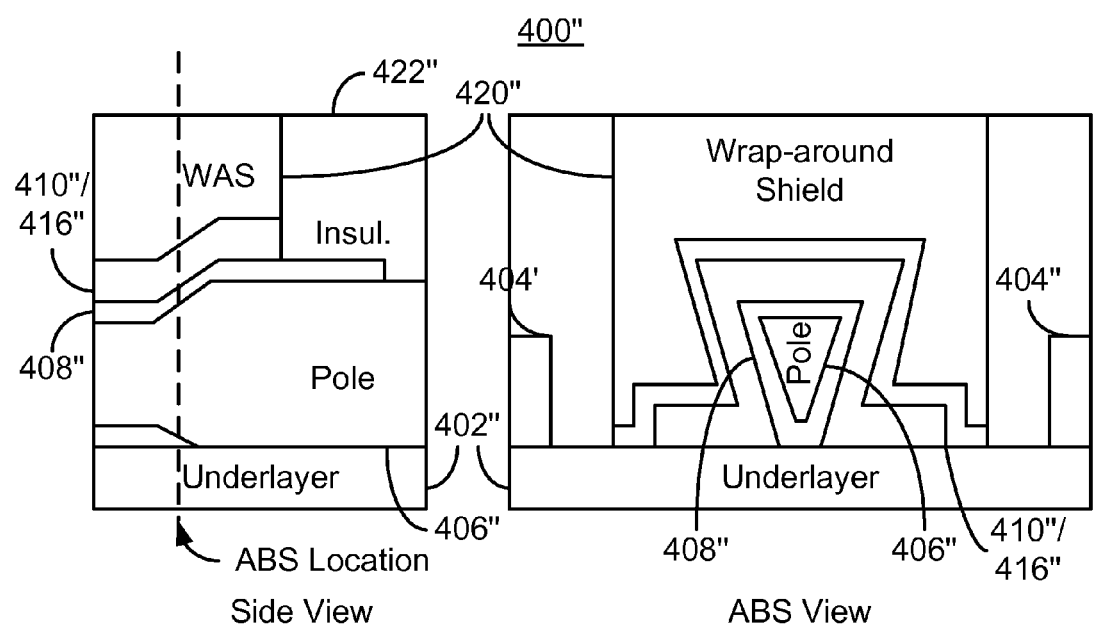

FIG. 19 is a flow chart depicting another exemplary embodiment of a method 300" for fabricating a magnetic transducer that may be a PMR transducer. For simplicity, some steps may be omitted. FIGS. 20-22 are diagrams depicting ABS views of an exemplary embodiment of a portion of a transducer 400' during fabrication. FIGS. 23-24 depict ABS and side views of the transducer 400. For clarity, FIGS. 20-24 are not to scale. Referring to FIGS. 19-24, the method 300" is described in the context of the transducer 400"'. However, the method 300" may be used to form another device (not shown). The transducer 400" being fabricated may be part of a merged head that also includes a read head (not shown in FIGS. 20-24) and resides on a slider (not shown) in a disk drive. The method 300" also may commence after formation of other portions of the transducer 400"'. The method 300" is also described in the context of providing a single transducer 400"'. However, the method 300" may be used to fabricate multiple transducers at substantially the same time. The method 300" and device 400" are also described in the context of particular layers. However, in some embodiments, such layers may include multiple sublayers. Portions of the method 300" and transducer 400" are analogous to the methods 300' and transducer 400'. Consequently, such portions are labeled similarly.

In one embodiment, the method 300" commences after formation of the underlayer(s) on which the main pole is to reside. The method 300" may also start after the main pole and nonmagnetic gap have been provided. The main pole may be a PMR pole having its top wider than its bottom. In addition, a top, or trailing edge, bevel may also be provided in the PMR pole. A bottom, or leading edge, bevel might also be provided in the PMR pole. The nonmagnetic gap may be insulating or conductive. For example, aluminum oxide may be used as an insulating, nonmagnetic gap layer. The gap layer may also be conformal, for example being deposited by the atomic layer deposition (ALD). The conductive gap layer may include Ru. Providing the gap may include depositing the gap layer, then removing the gap away from the pole. However, in other embodiments, other deposition mechanisms, including nonconformal deposition, may be used. In addition, the nonmagnetic gap may cover other structures in the transducer. The magnetic transducer may also include field regions that are distal from the main pole. For example, the field regions may be three to six microns or more from a wrap-around shield deposited on the main pole.

A mask covering a portion of the magnetic transducer 400' between the main pole and the field region is provided, via step 302". In some embodiments, the mask exposes the main pole. However, regions that would be exposed by the wrap-around shield (described below) may be covered by the mask. A thick seed layer is deposited while the mask is in place, via step 304". Thus, the thick seed layer resides on the mask and on the exposed portion of the transducer 400". Step 304" may include sputtering or otherwise depositing the thick seed layer. The thick seed layer may be magnetic or nonmagnetic. If magnetic, the thick seed layer may include materials such as CoFe, NiFe, and/or CoNiFe. If nonmagnetic, the thick seed layer may include materials such as Ru. The mask is then removed, via step 306". Step 306" may include performing a resist strip.

FIG. 20 depicts the transducer 400" after step 306" is performed. Thus, an underlayer 402" and field regions 404" are shown. Nonmagnetic gap layer 408" and main pole 406" are also shown. The structures 402', 404", 406", and 408" are analogous to structures 402, 404, 406, and 408, respectively. Also shown is a thick seed layer 414' that is analogous to the thick seed layer 414. In some embodiments, the thickness of the thicker seed layer 414' is fifty through one hundred nanometers. In some embodiments, the thickness of the thicker seed layer 414' is fifty through one hundred nanometers.

A thin seed layer is deposited, via step 308". The thin seed layer covers at least the nonmagnetic gap on the main pole. In addition, the thin seed layer may be sufficiently thin that it can be removed during the preclean before oxide deposition, described below. The thin seed layer may also be sufficiently thick that it is continuous and is electrically conductive for electroplating. In some embodiments, the thin seed layer is at least two nanometers and not more than twenty nanometers thick. In some such embodiments, the thin seed layer may be not more than ten nanometers thick. The thin seed layer may be magnetic or nonmagnetic. If magnetic, the thin seed layer may include materials such as CoFe, NiFe, and/or CoNiFe. If nonmagnetic, the thin seed layer may include materials such as Ru. The thin seed layer may include the same material(s) as or different material(s) from the thick seed layer.

FIG. 21 depicts the transducer 400" after step 308" is performed. Thus, the thin seed layer 410" that has been blanket deposited on the transducer 400" is shown. The thin seed layer 410" covers the gap layer 408", the main pole 406", the field oxide 404" and field regions around the field oxide 404", underlayer 402", and the thick seed layer 414". Thus, a patterned seed layer 416" is provided. The patterned seed layer 416" has thick portions corresponding to the combination of the thick seed layer 414" and portions of the thin seed layer 410". The patterned seed layer 416" also has thin portions corresponding to the thin seed layer 410". Thus, like the methods 300 and 300', a patterned seed layer 416" is provided in steps 302", 304", 306", and 308". However, the thin portion of the patterned seed layer 416" residing on the main pole 406" includes both a portion of the thick seed layer 414" and a portion of the thin seed layer 410".

A wrap-around shield is provided, via step 310". Step 310" is analogous to steps 310 and 310' of the methods 300 and 300'. Step 310" thus includes providing a mask that exposes a region proximate to the main pole 406", depositing the main pole, for example via electroplating, and removing the mask. FIG. 22 depicts the transducer 400" during step 310". Thus, the mask 418" for plating the wrap-around shield is shown and has not yet been removed. In addition, the wrap-around shield 420" is also shown. As can be seen in FIG. 22, a portion of the thin seed layer 410" is under the mask 418", and exposed by the shield 420".

After step 310", the field regions, which include the field oxide 404", are wet etched, via step 312". Step 312" is analogous to steps 312/312'. In some embodiments, the field etch includes a wet etch. For example, the field etch may be performed as follows. A mask covering critical regions proximate to the wrap-around shield 420 and covering portions of the field regions may be provided. This mask would expose part of the patterned seed layer distal from the wrap-around shield 420. This exposed portion of the patterned seed layer is removed to form a trench, for example via ion milling. This mask is then removed. A field etch mask that exposes the field regions, covers the critical regions, and covers a portion of the trench in the patterned layer is provided. A wet etch of the field regions may then be performed. Thus, the thicker portions of the patterned seed layer as well as excess plated material in the field regions are removed. In some embodiments, this field etch mask covers a region that extends over the main pole 406" and is three to six microns from the outer edges of the wrap-around shield 420". A wet etch that removes the exposed portions of the patterned seed layer 416" are thus removed. FIG. 23 depicts the transducer after step 312" has been performed. Consequently, portions of the patterned seed layer 416", including all portions of the thick seed layer 414" that would be exposed by the wrap-around shield 420", have been removed. The region proximate to the main pole 404" and wrap-around shield 420" remain. Only a portion of the thin seed layer/patterned seed layer 410"/416" remain. Of this, a portion of the thin seed layer 410"/patterned seed 416" is exposed by the wrap-around shield 420". Although not shown in FIG. 23, a portion of the thin seed layer 410"/patterned seed 416" exposed by the wrap-around shield is distal from the ABS.

The magnetic transducer is precleaned before oxide deposition, via step 314". Precleaning may include sputter etching or ion milling the magnetic transducer. During the precleaning in step 314", the portion of the thin seed layer 410" exposed by the wrap-around shield 420" is removed.

An aluminum oxide layer or other insulating layer is after the magnetic transducer is precleaned, via step 312". Step 312" may include masking a portion of the transducer, then depositing the insulating layer. FIG. 24 depicts side and ABS views of the magnetic transducer 400" after step 312" is performed. Thus, any portion of the thin seed layer 410'/patterned seed layer 416" that would reside under the insulating layer 422" and behind the wrap-around shield 420" as viewed from the ABS is removed. Similarly, the portion of the thin seed layer 410"/patterned seed layer 416" exposed by the wrap-around shield 420" and adjoining the wrap-around shield as seen from the ABS may be removed during the precleaning. An insulating layer 422" has also been provided.

The method 300" may provide the benefits of the methods 300 and 300'. More specifically, fabrication of the transducer 400" is facilitated substantially without adversely affecting performance of the transducer 400".

We claim:

1. A method for fabricating a magnetic recording transducer having a main pole on an underlayer, a nonmagnetic gap covering the main pole, and a field region distal from the main pole and separated from the main pole by a first portion of the underlayer, a portion of the nonmagnetic gap residing on the top of the main pole, the method comprising:

providing a patterned seed layer, a thin portion of the patterned seed layer having a first thickness, a thick portion of the patterned seed layer having a second thickness greater than the first thickness and being separated from the main pole by a second portion of the underlayer, at least part of the thick portion of the patterned seed layer residing on a portion of the field region;

providing a wrap-around shield on the patterned seed layer, at least part of the thin portion of the patterned seed layer residing in proximity to and exposed by the wrap-around shield; and field etching the field region distal from the wrap-around shield.

2. The method of claim 1 wherein the step of providing the patterned seed layer further includes:

depositing a thin seed layer having the first thickness, the thin seed layer covering at least the main pole;

providing a mask covering a portion of the magnetic transducer proximate to the main pole, covering a first portion of the thin seed layer, and exposing a second portion of the thin seed layer, the first portion of the thin seed layer forming the thin portion of the patterned seed layer;

depositing a thick seed layer on the second portion of the thin seed layer, the thick seed layer being thicker than the thin seed layer, the thick seed layer and the portion of the thin seed layer forming the thick portion of the patterned seed layer; and removing the mask such that the thick seed layer has an aperture therein, the main pole residing in the aperture.

3. The method of claim 1 wherein the step of providing the patterned seed layer further includes:

providing a mask covering a portion of the magnetic transducer between the main pole and the field region;

depositing a thick seed layer thicker than the first thickness;

removing the mask such that the thick seed layer has an aperture therein, the main Pole residing in the aperture; and depositing a thin seed layer having the first thickness, the thin seed layer covering the portion of the magnetic transducer and at least a portion of the thick seed layer, the at least the portion of the first thin seed layer in combination with the thick seed layer having the second thickness.

4. The method of claim 1 wherein the step of providing the patterned seed layer further includes:

providing a mask covering a first portion of the magnetic transducer proximate to the main pole and exposing a second portion of the magnetic transducer distal from the main pole;

depositing a thick seed layer covering at least the second portion of the magnetic transducer;

removing the mask;

depositing a thin seed layer having the first thickness and being thinner than the thick seed layer, a portion of the thin seed layer covering the second portion of the magnetic transducer, the thick seed layer in combination with the portion of the thin seed layer having the second thickness.

5. The method of claim 1 wherein the step of providing the wrap-around shield further includes:

electroplating at least a portion of the wrap-around shield on the patterned seed layer.

6. The method of claim 1 further comprising:

providing an insulating layer after the wrap-around shield is provided.

7. The method of claim 6 further comprising:

precleaning the magnetic transducer for the insulating layer, the at least the part of the thin portion of the patterned seed layer being removed during the precleaning before the step of providing the insulating layer.

8. The method of claim 7 wherein the step of precleaning the magnetic transducer further includes:

performing a sputter clean.

9. The method of claim 7 wherein the step of precleaning the magnetic transducer further includes:

ion milling the magnetic transducer.

10. The method of claim 1 wherein the first thickness is at least two nanometers and not more than twenty nanometers.

11. The method of claim 10 wherein the first thickness is not more than ten nanometers.

12. The method of claim 1 wherein the second thickness is not more than one hundred nanometers.

13. The method of claim 12 wherein the second thickness is at least twenty nanometers.

14. The method of claim 1 wherein the at least one of the thin portion of the patterned seed layer and the thick portion of the patterned seed layer is magnetic.

15. The method of claim 14 wherein both the thin portion and the thick portion of the patterned seed layer are magnetic.

16. The method of claim 14 wherein at least one of the thin portion and the thick portion of the patterned seed layer includes at least one of CoFe, NiFe, and CoNiFe.

17. The method of claim 1 wherein the at least one of the thin portion of the patterned seed layer and the thick portion of the patterned seed layer includes a nonmagnetic material.

18. The method of claim 17 wherein the nonmagnetic material includes Ru.

19. The method of claim 1 wherein the pole has a bottom and a top wider than the bottom.

20. The method of claim 1 wherein a portion of the thin portion of the patterned seed layer resides on the top of the main pole, is separated from the pole by the nonmagnetic gap, and is magnetic.

21. The method of claim 1 wherein a portion of the thick portion of the patterned seed layer resides on the top of the main pole, is separated from the pole by the nonmagnetic gap, and is magnetic.

22. A method for fabricating a magnetic recording transducer having a main pole, a nonmagnetic gap covering the main pole, and a field region distal from the main pole, a portion of the nonmagnetic gap residing on the top of the main pole, the method comprising:

blanket depositing a thin seed layer, the thin seed layer covering at least the nonmagnetic gap and being at least two nanometers and not more than twenty nanometers thick;

providing a mask covering a portion of the magnetic transducer proximate to the main pole including a first portion of the thin seed layer, the mask exposing a second portion of the thin seed layer;

depositing a thick seed layer on the second portion of the thin seed layer, the thick seed layer and the second portion of the thin seed layer having a thickness of at least twenty nanometers and residing distal from the main pole;

removing the mask;
providing a wrap-around shield, a third portion of the thin seed layer residing in proximity to and exposed by the wrap-around shield;
field etching the field region distal from the wrap-around shield;
precleaning the magnetic transducer, the third portion of the first seed layer being removed during the precleaning, the precleaning including at least one of sputter cleaning and ion milling; and
providing an aluminum oxide layer after the magnetic transducer is precleaned.

23. A method for fabricating a magnetic recording transducer having a main pole, a nonmagnetic gap covering the main pole, and a field region distal from the main pole, a portion of the nonmagnetic gap residing on the top of the main pole, the method comprising:
providing a mask covering a portion of the magnetic transducer between the main pole and the field region;
depositing a thick seed layer having a thickness of at least twenty nanometers and not more than one hundred nanometers, a first portion of the thick seed layer covering the main pole, a second portion of the thick seed layer residing in the field region;
removing the mask;
depositing a thin seed layer being at least two and not more than twenty nanometers thick, the thin seed layer covering the first portion of the magnetic transducer and at least a portion of the thick seed layer;
providing a wrap-around shield covering the first portion of the thick seed layer;
field etching the field region distal from the wrap-around shield;
precleaning the magnetic transducer, a portion of the thin seed layer exposed by the wrap-around shield being removed during the precleaning, the precleaning including at least one of sputter cleaning and ion milling; and
providing an aluminum oxide layer after the magnetic transducer is precleaned.

24. A method for fabricating a magnetic recording transducer having a main pole, a nonmagnetic gap covering the main pole, and a field region distal from the main pole, a portion of the nonmagnetic gap residing on the top of the main pole, the method comprising:
providing a mask covering a first portion of the magnetic transducer proximate to the main pole and exposing a second portion of the magnetic transducer distal from the main pole;
blanket depositing a thick seed layer;
removing the mask to expose the first portion of the magnetic transducer;
blanket depositing a thin seed layer, the thin seed layer being at least two nanometers and not more than twenty nanometers thick, a first portion of the thin seed layer residing on the first portion of the magnetic transducer, a second portion of the seed layer residing on a remaining portion of the thick seed layer, the remaining portion of the thick seed layer and the second portion of the thin seed layer having a thickness of at least twenty nanometers and residing distal from the main pole;
providing a wrap-around shield, a third portion of the thin seed layer residing in proximity to and exposed by the wrap-around shield;
field etching the field region distal from the wrap-around shield;
precleaning the magnetic transducer, the third portion of the first seed layer being removed during the precleaning, the precleaning including at least one of sputter cleaning and ion milling; and
providing an aluminum oxide layer after the magnetic transducer is precleaned.

* * * * *